(12) United States Patent
Chien et al.

(10) Patent No.: US 7,985,802 B2
(45) Date of Patent: Jul. 26, 2011

(54) SYNTHETIC FABRICS, COMPONENTS THEREOF, AND METHODS FOR MAKING THE SAME

(75) Inventors: William M. Chien, Houston, TX (US); William M. Ferry, Houston, TX (US); Chia Y. Cheng, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 398 days.

(21) Appl. No.: 12/105,986

(22) Filed: Apr. 18, 2008

(65) Prior Publication Data

US 2009/0264846 A1    Oct. 22, 2009

(51) Int. Cl.
C08L 23/04 (2006.01)
C08L 23/10 (2006.01)

(52) U.S. Cl. .................................. 525/191; 525/240

(58) Field of Classification Search .................. 525/191, 525/240
See application file for complete search history.

(56) References Cited

U.S. PATENT DOCUMENTS

| | | | |
|---|---|---|---|
| 4,540,753 A | 9/1985 | Cozewith et al. |
| 4,789,699 A | 12/1988 | Kieffer et al. |
| 4,923,547 A | 5/1990 | Yamaji et al. |
| 5,106,920 A | 4/1992 | Murakami et al. |
| 5,154,981 A | 10/1992 | Brant et al. |
| 5,171,628 A | 12/1992 | Arvedson et al. |
| 5,217,798 A | 6/1993 | Brady et al. |
| 5,260,126 A | 11/1993 | Collier, IV et al. |
| 5,332,613 A | 7/1994 | Taylor et al. |
| 5,366,793 A | 11/1994 | Fitts, Jr. et al. |
| 5,405,682 A | 4/1995 | Shawyer et al. |
| 5,425,987 A | 6/1995 | Shawver et al. |
| 5,503,908 A | 4/1996 | Faass |
| 5,536,563 A | 7/1996 | Shah et al. |
| 5,762,734 A | 6/1998 | DeLucia et al. |
| 5,804,021 A | 9/1998 | Abuto et al. |
| 5,900,306 A | 5/1999 | Stopper |
| 5,952,252 A | 9/1999 | Shawyer et al. |
| 6,107,222 A | 8/2000 | Joseph et al. |
| 6,129,964 A | 10/2000 | Seth |
| 6,133,173 A | 10/2000 | Riedel et al. |
| 6,190,758 B1 | 2/2001 | Stopper |
| 6,203,889 B1 | 3/2001 | Quincy, III et al. |
| 6,218,457 B1 | 4/2001 | Fralich et al. |
| 6,482,896 B2 | 11/2002 | Maugans et al. |
| 6,803,009 B2 | 10/2004 | Morman et al. |
| 6,835,264 B2 | 12/2004 | Sayovitz et al. |
| 6,878,648 B2 | 4/2005 | Mayhorn et al. |
| 6,900,147 B2 | 5/2005 | Morman et al. |
| 7,195,685 B2 | 3/2007 | Bevins, III et al. |
| 7,319,122 B2 | 1/2008 | Cheng et al. |
| 7,629,416 B2 * | 12/2009 | Li et al. .................. 525/191 |
| 2003/0207639 A1 | 11/2003 | Lin |
| 2004/0220336 A1 | 11/2004 | Abhari et al. |
| 2006/0020067 A1 | 1/2006 | Brant et al. |
| 2006/0135699 A1 | 6/2006 | Li et al. |

FOREIGN PATENT DOCUMENTS

| | | |
|---|---|---|
| EP | 247 898 | 11/1990 |
| EP | 247 896 | 6/1991 |
| EP | 544 652 | 6/1993 |
| EP | 288 227 | 7/1994 |
| JP | 10-158927 | 11/1996 |
| WO | WO 2006/002309 | 1/2006 |
| WO | WO 2006/118794 | 11/2006 |

OTHER PUBLICATIONS

G. Ver Strate et al., "Near Monodisperse Ethylene-Propylene Copolymers by Direct Ziegler-Natta Polymerization. Preparation, Characterization, Properties", Macromolecules, 1988, vol. 21, pp. 3360-3371.

* cited by examiner

*Primary Examiner* — Nathan M Nutter

(57) ABSTRACT

Provided are fabrics, components thereof, and methods for making the same. Woven and nonwoven fabrics are composed of fibers composed of a polyolefin composition. The polyolefin composition is composed of a propylene polymer and up to about 50 wt. %, based on the weight of the fiber, of a hydrocarbon resin. Fibers prepared from polyolefin compositions exhibit favorable elongation properties. Such fibers exhibit advantageous processing and enhanced levels of softness, durability, and elasticity, even at high spinning speeds required for preparing fine fibers.

24 Claims, 2 Drawing Sheets

SYNTHETIC FABRICS, COMPONENTS THEREOF, AND METHODS FOR MAKING THE SAME

FIELD OF THE INVENTION

This invention relates to woven and nonwoven fabrics, components thereof, and methods for making the same, and more particularly to compositions useful for preparing synthetic fibers.

BACKGROUND OF THE INVENTION

Synthetic woven and nonwoven fabrics are used to make a variety of products having various levels of softness, strength, durability, uniformity, liquid handling properties such as absorbency, liquid barrier properties, and other physical properties. Such products include towels, industrial wipes, incontinence products, infant care products such as baby diapers, absorbent feminine care products, and garments such as medical apparel. These products are often made with monolayer or multiple layer fabrics to obtain the desired combination of properties.

Woven and nonwoven fabrics are commonly made from fibers prepared by melt spinning thermoplastic materials, i.e., spunbond materials. Methods for making spunbond polymeric materials are well-known. Spunbond fibers are made by extruding a thermoplastic composition through a spinneret and drawing the extruded material into filaments with a stream of high velocity air. The filaments are then woven into fabrics or used to form a nonwoven fabric by forming a random fiber web on a collecting surface.

Spunbond materials with desirable combinations of physical properties, especially combinations of softness, strength and durability, have been produced, but limitations have been encountered. For example, for some applications, polymeric materials such as polypropylene may have a desirable level of strength but not a desirable level of softness. On the other hand, materials such as polyethylene may, in some cases, have a desirable level of softness but not a desirable level of strength. Accordingly, there is a need for fabrics that exhibit a balance of properties.

For fabrics that contact skin, such as the outer cover layer of a disposable baby diaper, it is desirable to improve the durability of nonwoven fabric while maintaining high levels of softness. Unfortunately, conventional nonwoven fabrics including a softer component, e.g., polyethylene, and a high strength component, e.g., polypropylene, have bonds between the multicomponent strands that are less durable and tend to pull apart when subjected to a load. Thus, more durable fabrics are needed.

Unfortunately, combinations of favorable properties are especially difficult to achieve for fine fibers due to the high spinning speeds needed to prepare such fibers. At higher spinning speeds, balanced properties are more difficult to achieve when using materials having tensile and elongational properties that are related to molecular weight, crystallinity, and molecular orientation of the fiber. In such applications, molecular orientation is relatively high, which results in low fiber orientation and fabrics that are not stretchable.

Accordingly there exists a current and long felt need for compositions that provide woven and/or nonwoven fabrics that overcome known deficiencies in conventional compositions, have advantageous processing and generally have enhanced levels of softness, durability, and elasticity.

SUMMARY OF THE INVENTION

Provided are fabrics, components thereof, and methods for making the same. The present woven and nonwoven fabrics are composed of fibers composed of a polyolefin composition. The polyolefin composition is composed of a propylene polymer and up to about 50 weight percent, based on the weight of the fiber, of a hydrocarbon resin.

In some embodiments, the polyolefin composition is composed of a first propylene polymer having a melt flow rate of about 1 to about 5000 dg/min (230° C., 2.16 kg), a second propylene polymer having a melt flow rate of about 1 to about 10 dg/min (230° C., 2.16 kg), and a hydrocarbon resin having a softening point of about 25 to about 200° C. Fibers prepared from the polyolefin composition are about 0.1 to 20 denier. In these embodiments, fibers exhibit an improved elongation at break, e.g., at least about 200%.

Fibers prepared from polyolefin compositions exhibit favorable elongation properties. Such fibers exhibit advantageous processing and enhanced levels of softness, durability, and elasticity, even at high spinning speeds required to prepare fine fibers.

DETAILED DESCRIPTION OF ILLUSTRATIVE EMBODIMENTS

Figure 1:
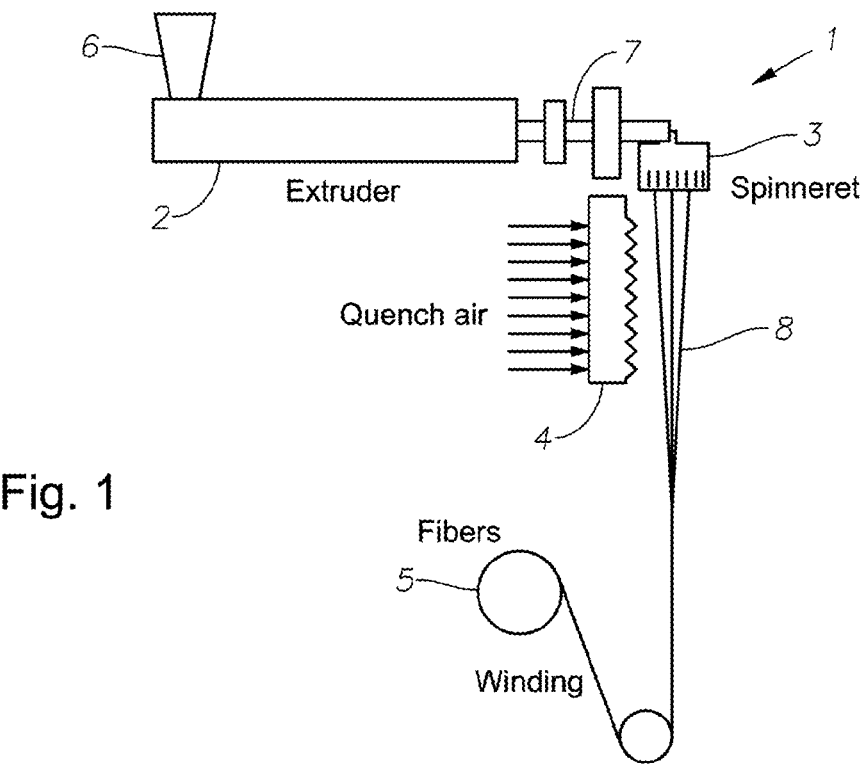
FIG. 1 is a depiction of an exemplary apparatus for preparing fibers.

Provided are fabrics, components thereof, and methods for making the same. The present woven and non-woven fabrics are composed of fibers composed of a polyolefin composition. Polyolefin compositions are composed of propylene polymers and up to about 50 weight percent (wt. %), based on the weight of the fiber, of a hydrocarbon resin. Preferably, the hydrocarbon resin is a hydrocarbon polymer additive that is a complex copolymer where the copolymer properties are controlled by manipulating the copolymer microstructure, i.e., type and amount of monomers.

The polyolefin compositions are utilized to prepare fibers for woven and nonwoven fabrics that have advantageous processing and enhanced levels of softness, durability, and elasticity, even at high spinning speeds required to prepare fine fibers. As used herein the term "nonwoven fabric" is a structure of fibers which are interlaid, but not in an identifiable repeating manner. Nonwoven fabrics have been formed by a variety of conventional processes such as, for example, meltblowing processes, spunbonding processes, and bonded carded web processes.

Fibers are prepared from any thermoplastic or thermoelastic material that forms self supporting fibers. Exemplary materials include polyamides, polyacrylonitrile, linear polyesters such as esters of ethylene glycol and terephthalic acid, polyvinylidene chloride, polyvinyl chloride, copolymers of vinyl chloride and vinyl acetate, polyvinyl butyral, polyvinyl acetate, polystyrene, silicone, resins, polyolefings, e.g., polypropylene and/or polyethylene, poyltrifluorochloroethylene, polymethylpentene, polyisobutylene, and combinations thereof. Also within this category are thermoplastic cellulose derivatives, such as cellulose acetate, cellulose propionate, cellulose acetate-propionate, cellulose acetate-butyrate and cellulose butyrate. Non resinous materials such as glass can be similarly processed.

Preferably, fibers are prepared from polyolefin compositions, which include propylene polymers. Propylene polymers are polymers composed of propylene monomers. As used herein "polypropylene", "polypropylene polymer(s)", or "propylene polymer(s)" mean homopolymers, copolymers, terpolymers, higher order copolymers, or interpolymers made from propylene derived units, or combinations thereof.

As used herein "homopolymer" means polymers resulting from the polymerization of a single monomer, i.e., a polymer consisting essentially of a single type of repeating unit.

As used herein, the term "copolymer(s)" refers to polymers formed by the polymerization of at least two different monomers. For example, the term "copolymer" includes the copolymerisation reaction product of propylene and an α-olefin, such as for example, 1-hexene.

"Polypropylene" includes stereoregular polypropylene, stereoregular polypropylene segments separated by amorphous polypropylene, amorphous polypropylene, polypropylene copolymers, polypropylene terpolyomers, and higher order polypropylene copolymers. As used herein "stereoregular polypropylene" means stereoregular propylene sequences long enough to crystallize under conditions known to those skilled in the art.

Preferably, propylene polymers are propylene-based copolymers, i.e., propylene copolymers, which may also be referred to as a propylene-α-olefin copolymers. Propylene copolymers includes one or more units, i.e., mer units, derived from propylene, one or more comonomer units derived from ethylene or α-olefins including from 4 to about 20 carbon atoms. Optionally, one or more comonomer units derive from dienes.

In one or more embodiments, the α-olefin comonomer units derive from ethylene, 1-butene, 1-hexane, 4-methyl-1-pentene and/or 1-octene. Exemplary alpha-olefins are selected from the group consisting of ethylene, butene-1, pentene-1,2-methylpentene-1,3-methylbutene-1, hexene-1, 3-methylpentene-1,4-methylpentene-1,3,3-dimethylbutene-1, heptene-1, hexene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1, and hexadodecene-1.

Exemplary diene comonomer units include 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, and dicyclopentadiene.

Propylene polymers include no more than about 35 wt. % of α-olefin comonomers, based on the weight of the propylene copolymer. Preferably, propylene copolymers include no more than about 20 wt. %, or no more than about 15 wt. % of α-olefin comonomers. More preferably, propylene copolymers include no more than about 12, or no more than about 10 wt. % of α-olefin comonomers. Still more preferably, propylene copolymers include no more than about 9, or no more than about 7 wt. % of α-olefin comonomers. In one or more embodiments propylene copolymers include from about 3.0 to about to about 7.0 wt. % of α-olefin comonomers. In other embodiments, propylene copolymers include from about 4 to about 6 wt. % of α-olefin comonomers. In still other embodiments, propylene copolymers include no more than about 5 wt. % or from about 3 to about 5 wt. % of α-olefin comonomers.

In one embodiment, propylene polymers have a melt index in dg/min ("MI"), according to ASTM D-1238 at 2.16 kg and 190° C., of not more than about 10, or not more than about 6.5, or not more than about 6, or not more than about 5.5, and in other embodiments not more than about 5.

In one embodiment, the melt flow rate ("MFR") of propylene polymers, as measured according to ASTM D-1238 at 2.16 kg weight and 230° C., is at least about 0.2 dg/min, or of at least about 0.2 dg/min, or at least about 0.5 dg/min, and in other embodiments at least about 1.0 dg/min. Propylene polymers have a melt flow rate of not more than about 5000 dg/min, or not more than about 3500 dg/min, or not more than about 3000 dg/min, or not more than about 2500 dg/min, or not more than about 2000 dg/min, or not more than about 1000 dg/min, or not more than about 350 dg/min, or not more than about 100 dg/min. In one or more embodiments, propylene polymers have an MFR of from about 0.5 dg/min to about 2000 dg/min, or from about 1 dg/min to about 350 dg/min, or from about 1 dg/min to about 30 dg/min, or from about 10 dg/min to about 30 dg/min, and in other embodiments from about 1 dg/min to about 10 dg/min. In a preferred embodiment, propylene polymers have an MFR of from about 8 dg/min to about 2000 dg/min.

In some embodiments where the polyolefin compositions is composed of more than one propylene polymer, a first propylene polymers has a high MFR and one or more additional propylene polymers have a comparatively low MFR. For example, a first polypropylene has an MFR of about 8 dg/min to about 2000 dg/min and a second polypropylene has an MFR of 1 dg/min to about 10 dg/min or from 1 dg/min to about 6 dg/min. Accordingly, provided herein are combinations of first propylene polymers, second propylene polymers, and optional additional propylene polymers each having MFR values within the presently identified ranges.

In one embodiment propylene polymers have a Mooney viscosity [ML (1+4) @ 125° C.], as determined according to ASTM D-1646, of less than about 100, or less than about 75, or less than about 60, and in other embodiments less than about 30.

Propylene polymers have a weight average molecular weight (Mw) of from about 5,000 to about 5,000,000 g/mole, or from about 10,000 to about 1,000,000 g/mole, or from about 20,000 to about 500,000 g/mole, and in other embodiments a Mw of from about 50,000 to about 400,000 g/mole. Preferably, propylene polymers have a Mw of at least 100,000.

In one embodiment, propylene polymers have a number average molecular weight (Mn) of from about 2,500 to about 2,500,000 g/mole, or from about 5,000 to about 500,000 g/mole, or from about 10,000 to about 250,000 g/mole, and in other embodiments a Mn of from about 25,000 to about 200,000 g/mole.

In one embodiment, propylene polymers are characterized by a heat of fusion, ("Hf"), determined by DSC according to ASTM E 793. Propylene polymers have a heat of fusion that is at least about 0.5 J/g, or at least about 1.0 J/g. Preferably, propylene polymers have a heat of fusion of at least 1.5 J/g, or at least about 3.0 J/g, or at least about 4.0 J/g, or at least about 6.0 J/g, and in other embodiments at least as high as about 70 J/g or 90 J/g. In some embodiments, propylene polymers have a heat of fusion of not more than about 80 J/g, or not more than about 70 J/g, or not more than about 60 J/g, or not more than about 50 J/g.

The molecular weight distribution index (MWD=(Mw/Mn)) of propylene polymers is from about 1 to about 40, or from about 1 to about 5, or from about 1.8 to about 5, and in other embodiments from about 1.8 to about 3. Techniques for determining the molecular weight and MWD may be found in U.S. Pat. No. 4,540,753 and Verstrate et al., 21, Macromolecules, 3360 (1988), each of which is herein incorporated by reference in its entirety.

Exemplary propylene polymers are commercially available from ExxonMobil Chemical Company in the ACHIEVE™ family of products, e.g., ACHIEVE 3854. Other useful propylene polymers available from ExxonMobil Chemical Company include PP3155, PP4712, and PP4772.

The present polyolefin compositions also include hydrocarbon resins. Hydrocarbon resins are hydrogenated or non-hydrogenated resins derived from petroleum streams. Hydrocarbon resins include aliphatic hydrocarbon resins, aromatic modified aliphatic hydrocarbon resins, aliphatic/aromatic resins, hydrogenated polycyclic resins, hydrogenated, polycyclic aromatic modified resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof. Conventional hydrocarbon resins are well known in the petroleum industry.

Hydrocarbon resins may be liquid at room temperature or solid at room temperature. Hydrocarbon resins include resin mixtures of a tackifier that is solid at room temperature and a tackifier that is a liquid at room temperature, and optionally a plasticizer oils.

In one or more embodiments, hydrocarbon resins have a Mn of at least 400, a Mw of at least 500, a Z average molecular weight (Mz) of at least 700, and a polydispersity (PD) as measured by Mw/Mn of at least 1.5 where Mn, Mw, and Mz are determined by Gel Permeation Chromatography. Similarly, the resin has a Mn up to 2000, a Mw of up to 3500, a Mz of up to 15,000 and a polydispersity (PD) as measured by Mw/Mn up to 4.

Generally hydrocarbon resins are produced by Friedel-Crafts or thermal polymerization of various petroleum feeds, which may be pure monomer feeds or refinery streams containing mixtures of various unsaturated materials. Friedel-Crafts catalysts include unsupported Lewis acids, e.g., boron trifluoride ($BF_3$), complexes of boron trifluoride, aluminum trichloride ($AlCl_3$), or alkyl-aluminum halides, particularly chloride.

Usually, the purer the feed stream the easier to polymerize. For example, pure styrene, pure alpha-methyl styrene, and mixtures thereof are easier to polymerize than a $C_8/C_9$ refinery stream. Similarly, pure or concentrated piperylene is easier to polymerize than $C_4$ to $C_6$ refinery streams. But pure monomers are more expensive to produce than refinery streams, which are often large volume refining byproducts.

Feed streams may include at least $C_4$ to $C_6$ monomers, from which cyclopentadiene and methylcyclopentadiene components may be removed by heating between 100° C. and 160° C. and fractionally distilling. The monomers may include at least one of isobutylene, butadiene, 2-methyl-2-butene, 1-pentene, 2-methyl-1-pentene, 2-methyl-2-pentene, 2-pentene, cyclopentene, isoprene, cyclohexene, 1,3-pentadiene, 1,4-pentadiene, isoprene, 1,3-hexadiene, 1,4-hexadiene, cyclopentadiene, and dicyclopentadiene.

Typically, feedstreams include at least 20 wt. %, alternatively 30 wt. %, or 50 wt. % monomer and up to 80 wt. %, alternatively 70 wt. %, or 30 wt. % solvent. The solvent is optionally aromatic, aliphatic, or combinations thereof. The solvent is optionally recycled. The solvent may optionally be a non-polymerizable feed component.

In addition to reactive components, feed streams optionally include non-polymerizable components including saturated hydrocarbons, which can be co-distilled with the unsaturated components such as pentane, cyclopentane, or 2-methylpentane. This monomer feed can be co-polymerized with other $C_4$ or $C_5$ olefins or dimers. The feed is preferably purified to remove unsaturated materials that adversely affect the polymerization reaction or give undesirable color to the final resin, e.g., isoprene. Generally, $C_5$ aliphatic hydrocarbon resins are synthesized using a piperylene concentrate stream that is fractionation-enriched to increase the piperylene content and to reduce the difficult-to-polymerize olefin and diolefin content The feed also optionally contain aromatic olefins such as styrene, indene, alpha-methylstyrene, beta-methylstyrene, indene, substituted indenes, such as methylindenes, vinyl toluenes, and their derivatives. The aromatic olefins are typically present at levels of at least 1 wt. %, and at levels up to 50 wt. %, alternatively up to 30 wt. %, or 10 wt. %.

Optionally, feedstreams include at least 30 wt. %, alternatively 50 wt. %, of $C_5$ monomers, as described above and at least 5 wt. %, alternatively 15 wt. % of a co-feed including at least one of pure monomer, $C_9$ monomers, and terpenes. Likewise, the feedstream may include up to 95 wt. %, alternatively up to 85 wt. % of $C_5$ monomers, as described above and up to 70 wt. %, alternatively up to 50 wt. %, of a co-feed including at least one of pure monomer, $C_9$ monomers, and terpenes.

Exemplary aliphatic hydrocarbon resins are prepared by cationic polymerization of a cracked petroleum feed containing $C_4$, $C_5$, and $C_6$ paraffins, olefins, and diolefins also referred to as "$C_5$ monomers". These monomer feed streams are composed of cationically polymerizable monomers such as butadiene, 1,3-pentadiene (piperylene) along with cyclopentene, pentene, 2-methyl-2-butene, 2-methyl-2-pentene, isoprene, cyclopentadiene, and dicyclopentadiene. The refining streams are usually purified by fractionation.

Polymerizations may be continuous or batch processes. A batch process reaction time is usually at least 30 minutes, alternatively 60 minutes, and no greater than 8 hours, alternatively 4 hours. Polymerization temperatures are at least −50° C. to 150° C., alternatively −20° C. to 100° C. Generally, higher-molecular-weight and high-softening-point resins are prepared at lower reaction temperatures. Polymerization may be stopped by removing the catalyst from the hydrocarbon resin, for example, by filtration. The hydrocarbon resin may be removed from a fixed bed reactor, which includes the catalyst. The hydrocarbon resin may be stripped to remove unreacted monomers, solvents, and low-molecular-weight oligomers. The unreacted monomers, solvents, and low-molecular-weight oligomers may be recycled.

Optionally, monomer feeds are co-polymerized with chain transfer agents. Chain transfer agents are added to obtain resins with lower molecular weight and narrower molecular weight distributions than can be prepared using monomers alone. Chain transfer agents terminate polymer chain growth such that polymer initiation sites regenerate. Components that behave as chain transfer agents include, but are not limited to, $C_4$ or $C_5$ olefin or dimers, isobutylene, 2-methyl-1-butene, 2-methyl-2-butene, or dimers or oligomers of these species. The chain transfer agent can be added to the reaction in pure form or diluted in a solvent. Typically, aromatic solvents are used, such as toluene, xylenes, or light aromatic petroleum solvents. These solvents can be used fresh or recycled from the process. The solvents generally contain less than 200 ppm water, alternatively less than 100, or less than 50 ppm water.

In some embodiments, hydrocarbon resins include resins containing 5 or 6 carbon atom dienes and mono-olefins. The resins typically contain 40 wt. % or more of polymerized dienes. The dienes are typically piperylene and/or isoprene.

In embodiments where the hydrocarbon resin is hydrogenated, the hydrogenation process is optionally achieved via molten-resin or resin-solution-based processes by either batchwise or, more commonly, continuous processes. Any of the known processes for catalytically hydrogenating hydrocarbon resins are used. Typically, supported monometallic and bimetallic catalysts based on Group-6, -8, -9, -10 or -11 elements are used for hydrocarbon resin hydrogenation. Good hydrogenation catalysts include:

supported nickel, e.g., nickel on alumina, nickel on charcoal, nickel on silica, nickel on kieselguhr, etc., supported palladium, e.g., palladium on silica, palladium on charcoal, palladium on magnesium oxide, etc., and supported copper and/or zinc, e.g., copper chromite on copper and/or manganese oxide, copper and zinc on alumina, etc.

Exemplary support material is composed of porous inorganic refractory oxides such as silica, magnesia, silicamagnesia, zirconia, silica-zirconia, titania, silica-titania, alumina, silica-alumina, alumina-silicate, etc., with supports containing gamma-alumina being preferred. Preferably, the supports are essentially free of crystalline molecular sieve materials. Mixtures of the foregoing oxides are also contemplated, especially homogeneous mixtures. Some embodiments select alumina, silica, carbon, MgO, $TiO_2$, $ZrO_2$, $FeO_3$ or their mixtures as supports.

Generic hydrogenation conditions include reaction temperatures of 100° C.-350° C. and hydrogen pressures of 5 atmospheres (506 kpa)-300 atmospheres (30390 kPa), for example, 10 to 275 atm (1013 kPa to 27579 kPa). Some embodiments select hydrogenation temperature in the range 180° C. to 320° C. These or other embodiments select pressure of 15195 kPa to 20260 kPa hydrogen. The hydrogen-to-feed volume ratio to the reactor under standard conditions (25° C., 1 atm (101 kPa) pressure) typically can range from 20-200. For the production of water-white resins, 100-200 is selected.

Another suitable process for resin hydrogenation is described in EP 0082726, which is fully incorporated herein by reference. This reference describes hydrogenation of a catalytic or thermal petroleum resin using nickel-tungsten catalyst on a gamma-alumina support where the hydrogen pressure is $1.47 \times 10^7$-$1.96 \times 10^7$ Pa and the temperature is 250-330° C. Thermal hydrogenation is usually performed at 160-320° C., at a pressure of $9.8 \times 10^5$ to $11.7 \times 10^5$ Pa and typically for 1.5-4 hours hydrogenation, the reactor mixture may be flashed and further separated to recover the resin. Steam distillation may be used to eliminate oligomers, preferably without exceeding 325° C.

Some embodiments utilze catalysts comprising nickel and/or cobalt on one or more of molybdenum, tungsten, alumina, or silica supports. These or other embodiments select 2 to 10 wt. % of nickel oxide and/or cobalt oxide on the support. After preparation, the support contains 5-25 wt. % tungsten or molybdenum oxide. Alternatively, the catalyst contains 4-7 wt. % nickel oxide and 18-22 wt. % tungsten oxide.

Exemplary hydrocarbon resins are commercially available as:

ESCOREZ™ 1310 LC (softening point 91° C.),

ECR 373 or ESCOREZ™ 2520,

ESCOREZ™ 5000 family, e.g., 5300, 5320, 5340, 5380, 5690, 5600, and 5620,

EMFR functionalized resin family, e.g., 100 and 101, each manufactured by Exxon Mobil Chemical Company,

PICCOTAC™ 95 the REGALREZ™ family of resins, e.g., REGALREZ™ 1018, 1033, 1065, 1078, and 1126 and REGALITE™ R-100, each manufactured by Hercules Corporation, the WINGTACK™ resin family manufactured by Goodyear (with the numerical designation being the softening point) such as WINGTACK™ 95, which is a solid resin having a softening point of about 95° C., and WINGTACK™ 10, which is a liquid resin having a softening point of about 10° C., ARKON™ family of resins, e.g., ARKON™ P-85, P-100, P-115, and P-125, each available from Arakawa Chemical.

Hydrocarbon resins may optionally include plasticizer oils such as SHELLFLEX™ 371, manufactured by Shell, and KAYDOL™ mineral oil, manufactured by Witco.

Preferred hydrocarbon resins are hydrocarbon polymer additives ("HPA"). "Hydrocarbon Polymer Additives" as used herein are complex copolymers that include monomers derived from piperylene, isoprene, amylenes, cyclics, styrene, indenic, or combinations thereof. Hydrocarbon polymer additives are polar or non-polar. "Non-polar" means the hydrocarbon polymer additive is substantially free of monomers having polar groups.

The properties of hydrocarbon polymer additives are manipulated by controlling the copolymer microstructure, i.e., type and amount of monomers. Monomer placement in the polymer chain is random leading to further complexity in the polymer microstructure. Differences in the hydrocarbon polymer additives are largely due to the olefins in the feedstock from which the hydrocarbon components are derived. Hydrocarbon polymer additives may contain aliphatic hydrocarbon components which have a hydrocarbon chain formed from $C_4$-$C_6$ fractions containing variable quantities of piperylene, isoprene, mono-olefins, and non-polymerizable paraffinic compounds. Such hydrocarbon polymer additives are based on pentene, butane, isoprene, piperylene, and contain reduced quantities of cyclopentadiene or dicyclopentadiene. Hydrocarbon polymer additives may also contain aromatic hydrocarbon structures having polymeric chains which are formed of aromatic units, such as styrene, xylene, α-methylstyrene, vinyl toluene, and indene.

Piperylenes are generally a distillate cut or synthetic mixture of $C_5$ diolefins, which include, but are not limited to, cis-1,3-pentadiene, trans-1,3-pentadiene, and mixed 1,3-pentadiene. In general, piperylenes do not include branched $C_5$ diolefins such as isoprene. In one embodiment, hydrocarbon polymer additives have from 40 to 90 wt. % piperylene, or from 50 to 90 wt. %, or more preferably from 60 to 90 wt. % piperylene, based on the weight of the hydrocarbon polymer additive. In a particularly preferred embodiment, hydrocarbon polymer additives are from 70 to 90 wt. % piperylene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene, dicyclopentadiene, cyclohexene, 1,3-cycylohexadiene, and 1,4-cyclohexadiene. A preferred cyclic is cyclopentadiene. Dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups.

In one embodiment, hydrocarbon polymer additives include up to 60 wt. % cyclics or up to 50 wt. % cyclics. Hydrocarbon polymer additives include at least about 0.1 wt. % cyclics, at least about 0.5 wt. % cyclics, or from about 1.0 wt. % cyclics. In at least one embodiment, hydrocarbon polymer additives include up to 20 wt. % cyclics or more preferably up to 30 wt. % cyclics. In a particularly preferred embodiments, hydrocarbon polymer additives comprises from about 1.0 to about 15 wt. % cyclics, or from about 5 to about 15 wt. % cyclics.

Hydrocarbon polymer additives optionally include isoprene. In some embodiments, hydrocarbon polymer additives are substantially free of isoprene, or may contain up to 5 wt. % isoprene, or more preferably up to 10 wt. % isoprene. In yet another embodiment, hydrocarbon polymer additives contain up to 15 wt. % isoprene.

Hydrocarbon polymer additives optionally include amylene. In some embodiments, hydrocarbon polymer additives are substantially free of isoprene, or may contain up to 10 wt. % amylene, or up to 25 wt. % amylene, or more preferably up to 30 wt. % amylene. In yet another embodiment, hydrocarbon polymer additives contain up to 40 wt. % amylene.

Preferred aromatics that may be in hydrocarbon polymer additives include one or more of styrene, indene, derivatives of styrene, and derivatives of indene. Particularly preferred aromatic olefins include styrene, alpha-methylstyrene, beta-methylstyrene, indene, and methylindenes, and vinyl toluenes.

Aromatic olefins are typically present in hydrocarbon polymer additives from 5 to 45 wt. %, or more preferably from 5 to 30 wt. %. In preferred embodiments, hydrocarbon polymer additives comprises from 10 to 20 wt. % aromatic olefins.

Styrenic components include styrene, derivatives of styrene, and substituted sytrenes. In general, styrenic components do not include fused-rings, such as indenics. In one embodiment, hydrocarbon polymer additives are composed of up to 60 wt. % styrenic components or up to 50 wt. % styrenic components. In one embodiment, hydrocarbon polymer additives are composed of from 5 to 30 wt. % styrenic components, or from 5 to 20 wt. % styrenic components. In a preferred embodiment, hydrocarbon polymer additives are composed of from 10 to 15 wt. % styrenic components.

Hydrocarbon polymer additives may include up to 5 wt. % indenic components, or up to 10 wt. % indenic components. Indenic components include indene and derivatives of indene. In one embodiment, hydrocarbon polymer additives include up to 15 wt. % indenic components. In another embodiment, the HPA is substantially free of indenic components.

Preferred hydrocarbon polymer additives have a melt viscosity of from 300 to 800 centipoise (cPs) at 160° C., or more preferably of from 350 to 650 cPs at 160° C. In a particularly preferred embodiment, the melt viscosity of hydrocarbon polymer additives is from 375 to 615 cPs at 160° C., or from 475 to 600 cPs at 160° C. The melt viscosity may be measured by a Brookfield viscometer with a type "J" spindle according to ASTM D-6267.

Generally hydrocarbon polymer additives have a Mw greater than about 600 g/mole or greater than about 1000 g/mole. In at least one embodiment, hydrocarbon polymer additives have a Mw of from 1650 to 1950 g/mole, or from 1700 to 1900 g/mole. Preferably hydrocarbon polymer additives have a weight average molecular weight of from 1725 to 1890 g/mole. Hydrocarbon polymer additives may have a Mn of from 450 to 700 g/mole, or from 500 to 675 g/mole, or more preferably from 520 to 650 g/mole. Hydrocarbon polymer additives may have a Mz of from 5850 to 8150 g/mole, or more preferably from 6000 to 8000 g/mole. Mw, Mn, and Mz may be determined by gel permeation chromatography (GPC).

In one embodiment hydrocarbon polymer additives have a polydispersion index ("PDI", PDI=Mw/Mn) of 4 or less. In a particularly preferred embodiment hydrocarbon polymer additives have a PDI of from 2.6 to 3.1.

Preferred hydrocarbon polymer additives have a glass transition temperature (Tg) of from about −30° C. to about 200° C., or from about 0° C. to 150° C., or from about 50° C. to 160° C., or from about 50° C. to 150° C., or from about 50° C. to 140° C. In other embodiments, hydrogen polymer additives have a Tg of from about 0° C. to 80° C., or from about 40-60° C., or from 45-55° C., or more preferably of from 48-53° C. Differential scanning calorimetry (DSC) is used to determine glass transition temperature.

Table 1 identifies ranges for preferred monomer combinations. The structures shown in Table 1 are representative only and not limiting. Typical physical and chemical properties of these exemplary hydrocarbon polymer additives are identified in Table 2.

TABLE 1

|  | Exemplary HPA 1 | Exemplary HPA 2 | Representative Structure |
|---|---|---|---|
| %-Piperylene (P) | 50-90 | 60-90 |  |
| %-Isoprene (I) | 0-5 | 0-5 |  |
| %-Amylenes (A) | 10-30 | 0-10 |  |
| %-Cyclics (C) | 0-5 | 5-15 |  |
| %-Styrenic (St) | 0-10 | 5-20 |  |
| %-Indenic (In) | 0-10 | 0-5 |  |

TABLE 2

|  | Melt Viscosity at 160° C. (cPs) | Mn (g/mole) | Mw (g/mole) | Mz (g/mole) | PDI | Tg ° C. |
|---|---|---|---|---|---|---|
| Exemplary HPA 1 | 375-515 | 700-900 | 1400-1800 | 3000-5000 | 1.5-2.5 | 45-50 |
| Exemplary HPA 2 | 375-615 | 520-650 | 1725-1890 | 6000-8200 | 2.6-3.1 | 48-53 |

Exemplary hydrocarbon polymer additives are commercially available as the Oppera™ series of polymeric additives from ExxonMobil Chemical Company.

In addition to hydrocarbon resins, fibers may also contain well-known additives such as anti-block, anti-static, antioxidants, UV stabilizers, neutralizers, lubricants, surfactants, solvent repellents, wetting agents, flame retardants, stabilizers to ultraviolet radiation, stabilizers to heat, and/or nucleating agents. Additives include silicon dioxide, titanium dioxide, polydimethylsiloxane, talc, dyes, colorants wax, calcium stearate, calcium carbonate, carbon black, and glass beads. Fibers also optionally include additional thermoplastic polymers, such as functionalized or unfunctionalized thermoplastic polymers, and low crystallinity thermoplastic polymers. Such additives may be substantially stationary within the fibers, or may migrate to the fiber surface when exposed to heat.

Fibers are composed of up to 99 wt. % propylene polymers and up to 60 wt. % hydrocarbon resin. In some embodiments fibers contain up to 80 wt. %, or up to 70 wt. %, or up to 60 wt. %, or up to 50 wt. % propylene polymers. In some embodiments fibers contain up to 50 wt. %, or up to 40 wt. %, or up to 30 wt. %, or up to 20 wt. %, or up to 10 wt. % hydrocarbon resin. In a preferred embodiment, fibers are composed of from 10 wt. % to 40 wt. % or from 12 wt. % to 18 wt. % of hydrocarbon resins. In other embodiments, fibers are composed of from 15 wt. % to 35 wt. % or 20 wt. % to 35 wt. % of hydrocarbon resins.

Fibers are fabricated by preparing the present polyolefin compositions and forming fibers from the polyolefin compositions. Polyolefin compositions are prepared by melt blending or dry blending thermoplastic and/or elastic materials, hydrocarbon resins, and optional additives. For example, a polyolefin composition is prepared by melt blending or dry blending one or more propylene polymers, a hydrocarbon polymer additive, and optional additives. In some embodiments, polyolefin compositions are prepared by preblending one or more components, i.e., forming masterbatches. For example, masterbatches of hydrocarbon polymer additive and propylene polymer are prepared before melt blending or dry blending the masterbatch with other fiber components, i.e., polyolefin composition components and/or optional additives. Forming masterbatches is particularly useful when blending hydrocarbon polymer additives, which are typically difficult to optimally dispersed in a polyolefin composition. Masterbatching these resins provides substantially homogeneous dispersion and improved compatibility compared to addition of neat hydrocarbon polymer additives.

Typical masterbatches are formed by blending a hydrocarbon polymer additive with a compatible polyolefin. For example, hydrocarbon polymer additives are masterbatched with polyethylene or polypropylene. An exemplary polypropylene for use in masterbatching is commercially available as PP4772 from ExxonMobil Chemical Company. Exemplary polyethylenes for use in masterbatching are available in the EXACT™ family of products, e.g., EMPA 851, EXCEED™ family of products, or ENABLE™ family of products, which are each available from ExxonMobil Chemical Company.

Although the present fibers may be fabricated using many different processes, FIG. 1 shows an exemplary apparatus for preparing the present fibers. Other processes may be used such that the apparatus of FIG. 1 is not an exclusive device for preparing the present fibers. The description of this exemplary apparatus and process are not limiting.

Referring to FIG. 1, a process line 1 includes an extruder 2, spinneret 3, quench blower 4, and a roller 5. A polyolefin composition is fed into extruder 2 from a hopper 6. Optionally, more than one extruder may be utilized to separately add additional components or masterbatches of components. The polyolefin composition is fed from the extruder 2 through respective polymer conduits 7 to a spinneret 3. Spinnerets for extruding filaments are well-known to those of ordinary skill in the art and thus are not described here in detail. Generally described, the spinneret 3 includes a housing containing a spin pack which includes a plurality of plates stacked one on top of the other with a pattern of openings arranged to create flow paths for directing the polyolefin composition through the spinneret. The spinneret 3 has openings arranged in one or more rows. The spinneret 3 openings form a downwardly extending curtain of filaments 8 when the polymers are extruded through the spinneret 3.

The quench blower 4 is positioned adjacent the curtain of filaments 8 extending from the spinneret 3. Air from the quench air blower 4 cools the curtain of filaments 8. Optionally, fiber draw units or aspirators (not shown) are positioned below the spinneret 3 to receive the quenched filaments. Fiber draw units or aspirators for use in melt spinning polymers are well-known in the art. The fibers are then utilized to make a fabric or rolled onto rollers 5 for later processing.

When forming nonwoven fabrics, a forming surface (not pictured) is positioned below the spinneret 3 to receive the curtain of filaments 8. The forming surface travels around guide rollers (not shown). Optionally, a vacuum (not pictured) is positioned below the forming surface to draw the fibers against the forming surface. In other embodiments, bonding/calendering rollers for bonding the fibers together and integrating the web are utilized to form a finished nonwoven fabric. The fiber pattern formed by the fibers may vary based on the degree of fabric strength desired. Fiber patterns are readily known by those skilled in the art.

Optionally, the temperature of air from a heater is varied and thus the temperature to which the curtain of filaments is heated can be varied to achieve different levels of crimp. It should be understood that the temperatures of the aspirating air to achieve the desired crimp will depend on factors such as the type of polymers in the fibers and the denier of the fibers. Denier is a unit of measure for the linear mass density of fibers. Denier is the mass in grams per 9,000 meters.

In one or more embodiments, fibers are from about 0.1 to about 50 denier, or from about 0.1 to about 40 denier, or from about 0.1 to about 30 denier. Preferably, fibers are from about 0.1 to about 10 denier, or from about 1 to about 5 denier, or from about 1.2 to about 4.8 denier.

Fibers are formed to any desired diameter. Fiber size may be controlled by spinning apparatus output rate. For example, the RPM of a gear pump and the speed of the rollers are adjusted to produce fibers of a desired size. Monofilaments are usually preferred but multifilaments may also be formed. Both are referred to herein generically as fibers.

Typical fibers have a diameter less than about 500 microns. Small-diameter fibers, i.e., microfibers, have an average diameter not greater than about 100 microns, for example, having a diameter of from about 0.5 microns to about 50 microns, more specifically microfibers may also have an average diameter of from about 4 microns to about 40 microns or from about 15 to about 25 microns. Coarse fibers generally have diameters from 10 to 50 microns. Fine fibers have diameters below 10 microns and preferably below 5 microns down to 0.1 microns or less. Thinner fibers generally give a nonwoven web having a finer pore size, and coarser fiber generally give a nonwoven web having a larger pore size.

Fibers have any desired cross-sectional configuration including for example generally round, elliptical, square, hourglass, triangular, pentagonal, V- or U-channel, T-shaped or I-shaped, or other cross-sectional shapes. Fibers are solid, tubular, cellular, or foamed.

Typical extrusion temperatures are well known in the art and are dependent on the composition of the fibers. For example, when polypropylene and/or polyethylene based polymers are utilized, extrusion temperatures generally are from about 300° F. (148.89° C.) to about 500° F. (260° C.) or from 400° F. (204.44° C.) to about 450° F. (232.22° C.). In various applications, the temperatures utilized can be above or below these ranges.

Process velocity is usually measured in feet per minute. The enclosed methods are useful for high and low speed manufacturing processes. Preferably, the present methods are utilized in high speed manufacturing processes. Typically, fibers are formed at greater than about 50 feet per minute (15.24 m/min). In some embodiments, fibers are formed at greater than 100 feet per minute (30.48 m/min), greater than about 200 feet per minute (60.96 m/min), greater than about 300 feet per minute (91.44 m/min), greater than about 500 feet per minute (152.4 m/min), greater than 1000 feet per minute (304.8 m/min), or greater than 2000 feet per minute (609.6 m/min), greater than 3000 feet per minute (914.4 m/min), or greater than 12000 feet per minute (3657.6 m/min). Generally, fibers are formed at from about 100 to about 500 feet per minute (30.48-152.4 m/min), or from about 300 to about 500 feet per minute (91.44-152.4851498 m/min).

In one or more embodiments, fibers have a resulting speed to break of at least about 250 m/min, or at least about 1000 m/min, or at least about 2000 mimin, or at least about 3000 m/min. Preferably, fibers have a resulting speed to break of about 2000 to about 3500 m/min.

In one or more embodiments, fibers have an elongation at break of at least 200%, or at least about 210%, or at least about 225%, or at least about 240%, or at least about 250%. Preferably, fibers have a resulting speed to break of about 215% to about 275%.

Fabrics are single or multilayer structures. Fabrics prepared from the present fibers exhibit favorable elastic properties. Fabrics are typically used in hygene, personal care, and medical applications. Such products include towels, industrial wipes, incontinence products, infant care products such as baby diapers, absorbent feminine care products, and garments.

In one or more embodiments, fabrics are laminated with elastic strand or film. Upon release of a stretch force, the elastic strand or film causes nonwoven fabrics to retract thereby producing elastic nonwoven fabrics with high stretchability.

In one or more embodiments, fibers of different sizes are used in different regions of a nonwoven fabric. For example, fine fibers from one set of orifices are deposited in a first portion of a nonwoven fabric and coarse fibers from another set of orifices are deposited in a second portion of the nonwoven fabric. This configuration provides a nonwoven fabric of graded and tapered pore size, decreasing from coarse to fine, such as from the exterior to the interior of the nonwoven fabric. Similarly, blends of fine and coarse fibers are deposited throughout the depth of the nonwoven fabric by employing a spinning die having mixed diameter orifices, with a variety of diameters extending from fine to coarse.

Fabrics may optionally be treated with conventional surface treatments or contain conventional polymer additives to enhance fabric wettability. For example, nonwoven fabrics may be treated with polyalkaline-oxide modified siloxane and silanes such as polyalkaline-dioxide modified polydimethyl-siloxane. Such a surface treatment enhances the wettability of the fabric so that the fabric is suitable as a liner or surge management material for feminine care, infant care, child care, and adult incontinence products. The fabric of the present invention may also be treated with other treatments such as antistatic agents, alcohol repellents, and the like, as known to those skilled in the art.

Alternatively and/or additionally, fabrics may optionally be bonded, e.g., interfiber bonding. As used herein, the term "interfiber bonding" means bonding produced by thermal bonding or entanglement between the individual nonwoven fibers to form a coherent web structure. Fiber entangling is inherent in conventional meltblown processes but may be generated or increased by processes such as, for example, hydraulic entangling or needle-punching. One or more thermal bonding steps are employed in most processes for forming spunbond webs. A bonding agent may be utilized to increase the desired bonding and to maintain structural coherency of the web. For example, powdered bonding agents and chemical solvent bonding may be used.

Conventional compositions and uses thereof are described in U.S. Pat. Nos. 7,319,122; 7,195,685; 6,900,147; 6,878,648; 6,835,264; 6,803,009; 6,218,457, 6,190,758; 6,133,173; 6,129,964; 6,107,222; 5,952,252; 5,900,306; 5,804,021; 5,536,563; 5,503,908; 5,425,987; 5,405,682; 5,366,793; 5,332,613; 5,260,126; 5,217,798; 5,171,628; 4,923,547; 4,789,699, each of which is herein fully incorporated herein by reference. Conventional compositions are also described in U.S. Patent Publication Nos. 2003/0207639 and 2006/0135699 and JP 10-158927, each of which is fully incorporated herein by reference. Other compositions and uses thereof are described in U.S. Pat. Nos. 6,482,896; 6,203,889; 5,762,734; 5,154,981; European Patent Nos. 247896, 247898, 288227, and 544652, and WO 2006/02309, each of which is fully incorporated herein by reference.

In other embodiments, also provided are:

A. A fiber comprising a polyolefin composition comprising at least one polypropylene having:
    a melt flow rate of about 8 to about 2000 dg/min (230° C., 2.16 kg) and,
    a Mw/Mn of about 3 or less, and
    a hydrocarbon resin.

B. The fiber of embodiment A, wherein the polyolefin composition comprises:
    about 60 to about 90 wt. %, based on the total weight of the fiber, of a first propylene polymer having:
    a melt flow rate of about 8 to about 2000 dg/min (230° C., 2.16 kg) and,
    a Mw/Mn of about 3 or less;
    about 5 to about 35 wt. % of a second propylene polymer having a melt flow rate of about 1 to about 6 dg/min (230° C., 2.16 kg);

C. The fiber of embodiments A or B, wherein the polyolefin composition comprises from about 5 to about 25 wt. % of a hydrocarbon resin having a softening point of about 50 to about 160° C.

D. The fiber of any of embodiments A-C, wherein the fiber:
    is about 1 to 5 denier,
    has an elongation at break of at least about 200%.

E. The fiber of any of embodiments B-D, wherein the first polypropylene polymer is a homopolymer.

F. The fiber of any of embodiment B-E, wherein the first polypropylene polymer is a copolymer.

G. The fiber of embodiment F, wherein the comonomer is derived from ethylene, hexene, or octene.

H. The fiber of any of embodiment B-E, wherein the first propylene polymer has a heat of fusion (Hf) greater than about 70 J/g.

I. The fiber of any of embodiment A-H, wherein the fibers are about 1.2 to about 4.8 denier.

J. The fiber of any of embodiment A-H, wherein the fibers are about 1.4 to about 4.5 denier.

K. The fiber of any of embodiment A-H, wherein the fibers are about 2 to about 4 denier.

L. The fiber of any of embodiment A-K, wherein the hydrocarbon resin is a hydrogenated DCPD resin.

M. The fiber of any of embodiment A-L, wherein the hydrocarbon resin has a Tg of about 80 to about 150° C.

N. The fiber of any of embodiment A-M, wherein the fibers have an elongation of at least about 210%.

O. The fiber of any of embodiment A-N, wherein the fibers have an elongation of at least about 10% greater than that of fibers without the addition of the hydrocarbon resin.

P. The fiber of any of embodiment A-O, wherein the fibers comprise from about 8 to about 23 wt. % hydrocarbon resin, based on the total weight of the fiber.

Q. The fiber of any of embodiment A-P, wherein the fibers comprise from about 12 to about 18 wt. % hydrocarbon resin, based on the total weight of the fiber.

R. The fiber of any of embodiment A-Q, wherein the hydrocarbon resin has a softening point of about 50 to about 150° C.

S. The fiber of any of embodiment A-R, wherein the melt flow rate of the first propylene polymer and the melt flow rate of the second propylene polymer differ by at least 10 dg/min.

T. The fiber of any of embodiment A-S, wherein the hydrocarbon resin is a hydrocarbon polymer additive.

U. The fiber of embodiment T, wherein the hydrocarbon polymer additive comprises comonomers of piperylene, isoprene, amylenes, cyclics, styrene, indenic, or combinations thereof.

V. The fiber of embodiment T or U, wherein the hydrocarbon polymer additive comprises:
   from 60 wt. % to 90 wt. % piperylene,
   from 5 wt. % to 15 wt. % cyclic components, and
   from 5 wt. % to 20 wt. % styrenic components.

W. A fabric comprising a fiber of any of embodiments A-Y.

X. The fabric of embodiment W, wherein the fabric is a nonwoven fabric.

Y. The fabric of embodiment W, wherein the fabric is a woven fabric.

Z. A process of preparing a fiber comprising the steps of:
   a. providing a polyolefin composition of any of embodiments A-H or R-V, and
   b. forming the polyolefin composition into one or more fibers AA. The process of preparing a fiber of embodiment Z, wherein the fiber is of about 1 to about 5 denier and has an elongation at break of at least about 200%.

BB. The process of preparing a fiber of embodiment Z or AA, wherein the fiber has a resulting speed to break of about 2000 to about 3500 m/min.

CC. The process of preparing a fiber of any of embodiments Z-BB, wherein fibers are prepared by combining the hydrocarbon resin with the second propylene polymer in a masterbatch prior to contacting with the first propylene polymer.

DD. The process of preparing a fiber of any of embodiments Z-CC, wherein the fibers are formed by spin blowing.

EE. A process for preparing a fabric comprising the steps of:
   a. preparing a fiber according to the process of any of embodiment Z-CC, and
   b. forming a woven fabric.

FF. A process for preparing a fabric comprising the steps of:
   a. preparing a fiber according to the process of any of embodiment Z-CC, and
   b. forming a non-woven fabric.

Certain features of the present invention are described in terms of a set of numerical upper limits and a set of numerical lower limits. It should be appreciated that ranges from any lower limit to any upper limit are within the scope of the invention unless otherwise indicated.

The above description is intended to be illustrative, and should not be considered limiting. Persons skilled in the art will recognize that various modifications may be made without departing from the spirit and scope of the invention. Accordingly, this description will be deemed to include all such modifications that fall within the appended claims and their equivalents.

EXAMPLES

The following examples, which are not intended to be limiting, present certain embodiments and advantages of fibers made from the present polyolefin compositions. Unless otherwise indicated, all percentages are on a weight basis.

Several Compositions A-G were prepared to compare fiber properties and processability. Referring to Table 3, Composition A was a propylene homopolymer composition that contained no hydrocarbon resins. The propylene homopolymer had a melt flow rate (230° C./2.16 kg) of 35 g/10 min as measured by ASTM D-1238 and a density of 0.9 g/cm$^3$. The propylene homopolymer is commercial available as PP3155 from ExxonMobil Chemical Company.

Compositions B-G contained varying amounts of hydrocarbon resin, i.e., hydrocarbon polymer additive, as described in Table 3. The hydrocarbon polymer additive of Compositions B-F had a ring and ball softening point of 135° C., a glass transition temperature of 94° C., and a color less than 5 Yellowness Index (YI) as measured by spectrophotometric analysis of a toluene solution containing 50% resin. This hydrocarbon polymer additive is commercially available in a non-masterbatched form as OPERRA™ PR 100 from ExxonMobil Chemical Company. The hydrocarbon polymer additive of Compositions G had a ring and ball softening point of 138° C., a glass transition temperature of 94° C., a color less than 1 Yellowness Index (YI), and is commercially available as EMPR 106 from ExxonMobil Chemical Company.

The hydrocarbon polymer additives of Compositions B, C, D, and F were added as a masterbatch of 50% hydrocarbon polymer additive and 50% polypropylene homopolymer having an MFR of about 4. The propylene homopolymer masterbatched with the hydrocarbon polymer additive is commercially as PP4772 from ExxonMobil Chemical Company.

The hydrocarbon polymer additive masterbatch and polyolefin composition of Compositions B-D were added separately to a single screw extruder and melt blended. Similarly the components of Composition E and G were added separately to a single screw extruder and melt blended. The hydrocarbon polymer additive masterbatch and polyolefin composition of Composition F were dry blended prior to extrusion.

TABLE 3

| Composition | Polyolefin Composition | Hydrocarbon Resin Masterbatch | Total Hydrocarbon Resin Content |
| --- | --- | --- | --- |
| A | 100% | 0% | — |
| B | 90% | 10% | 5% |
| C | 80% | 20% | 10% |
| D | 70% | 30% | 15% |
| E | 90% | — | 10% |
| F | 80% | 20% | 10% |
| G | 90% | — | 10% |

Each Composition was evaluated for processability. The Compositions were spun into fibers on a conventional fiber spinning apparatus. The apparatus spinneret had 72 capillaries that produced a fiber bundle. The fiber bundle was prepared in a partially oriented yarn mode, as commonly used in the art—the fiber was drawn down mechanically by godets, i.e., rollers, and wound into a spool without solid state orientation.

Spinnability was measured by keeping output rate constant at 0.6 gram/mole/min and increasing the fiber speed until it failed to draw down when the fibers broke, i.e., speed to break. Under the same spinning conditions, the speed to break for Compositions B-F nearly approached the speed of the neat homopolymer Composition A. For example, Composition A exhibited a speed to break of about 4500 m/min. Compositions B-F exhibited a speed to break of about 2500-3000 m/min. It was observed that spinnability improved when no force quenching was utilized.

Referring to Table 4, the fibers were evaluated for physical properties. In Table 4, "Dpf" refers to denier per filament as measured by denier of the yarn divided by the number of the filament in the yarn. Denier of the yarn is measured by weighing 9000 meter of the yarn in grams. "Ghm" is gram per hole per minute, as measured by total throughput of the polymer passing the spinneret by the number of holes of the spinneret. "Speed" is in meter per minute as measured by the winder speed indicator. "Stick Point" means the point in centimeter (cm) in the spin line from the spinet where the polymer ceases to be "sticky", or where the polymer solidifies, as measured by sliding a glass rode along the spinning line towards the spinneret. Tensile Strength and elongation were measured by a Statimat instrument produced by Textechno Corporation. The program automatically calculated the tensile strength in grams/denier and elongation at break.

TABLE 4

| Comp. | Total denier | Dpf | Ghm | Speed | Stick Pt. | Fiber Speed 1500 Tensile Strength | Fiber Speed 1500 Elongation | Fiber Speed 2500 Tensile Strength | Fiber Speed 2500 Elongation |
|---|---|---|---|---|---|---|---|---|---|
| A | 104 | 1.4444 | 0.40123 | 2500 | — | — | — | 2.46 | 165 |
| A |  | 3.88 | 0.64667 | 1500 | — | 2.19 | 207 | — | — |
| A |  | 2.36 | 0.65556 | 2500 | — | — | — | 2.54 | 182 |
| A | 177 | 2.4583 | 0.40972 | 1500 | — | 2.24 | 231 | — | — |
| B | 276 | 3.8333 | 0.63889 | 1500 | — | 1.73 | 265 | — | — |
| C | 177 | 2.4583 | 0.68287 | 2500 | — | — | — | 1.91 | 202 |
| C | 290 | 4.0278 | 0.6713 | 1500 | — | 1.79 | 333 | — | — |
| D | 301 | 4.1806 | 0.69676 | 1500 | 100 | 1.63 | 310 | — | — |
| E | 178 | 2.4722 | 0.41204 | 1500 | — | 2.27 | 221 | — | — |
| E | 297 | 4.125 | 0.6875 | 1500 | 105 | 1.98 | 235 | — | — |
| E | 178 | 2.4722 | 0.68673 | 2500 | 85 | — | — | 2.2 | — |
| F | 293 | 4.0694 | 0.67824 | 1500 | 120 | 1.78 | 315 | — | — |
| G | 176 | 2.4444 | 0.40741 | 1500 | 75 | 1.86 | 326.84 | — | — |

Figure 2:
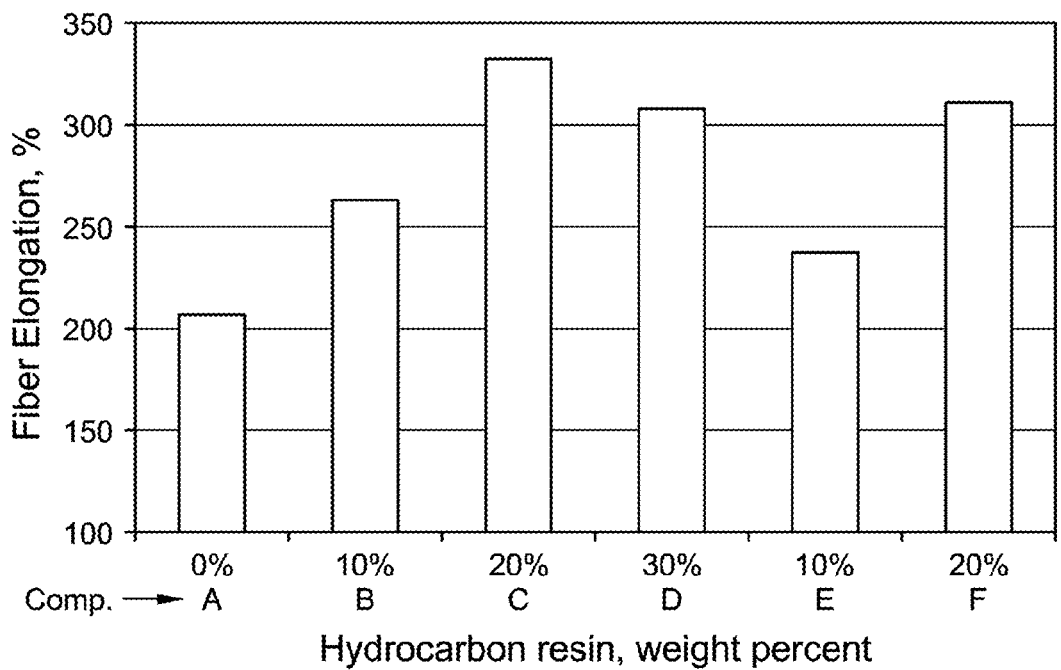
FIG. 2 is a bar chart showing elongation properties of various fibers.
Figure 3:
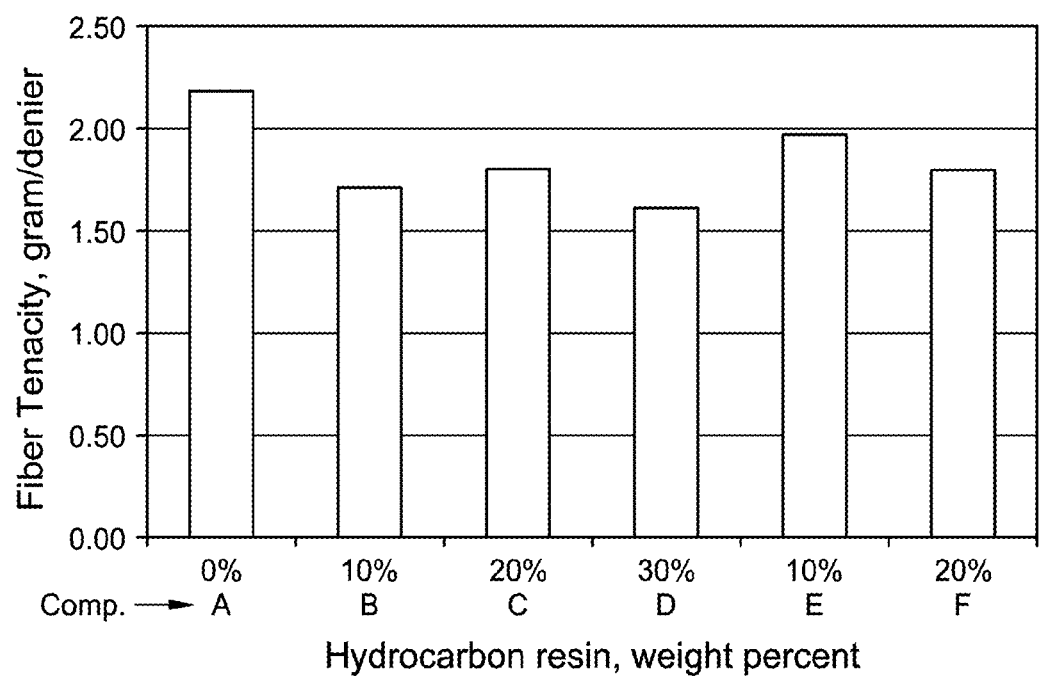
FIG. 3 is a bar chart showing tensile strength properties for various fibers.

Referring to Table 4, FIGS. 2 & 3, and comparing Composition A with Compositions A-G, a substantial increase in fiber elongation was observed with the addition of hydrocarbon resin. Compositions C and G exhibited the highest elongation. Referring to FIG. 3, Compositions B-F exhibited lower tensile strength compared to Composition A. The lower fiber tensile strength associated with higher elongation confirmed the elongation results of FIG. 2. Overall, Compositions B-G exhibited a good balance of properties.

Without being limited by theory, it is believed that Composition E exhibited lower elongation compared to Compositions D and F due to compounding difficulties associated with feeding and mixing neat hydrocarbon resin with polyolefin. For example, non-uniformity of the mix or blend may result from non-uniform particle size, dust, and low melt temperature of the hydrocarbon resin.

What is claimed is:

1. A fiber comprising a polyolefin composition comprising:
   a. about 60 to about 90 wt. %, based on the total weight of the fiber, of a first propylene polymer having:
      a melt flow rate of about 1 to about 5000 dg/min (230° C., 2.16 kg) and,
      a Mw/Mn of about 3 or less,
   b. about 5 to about 35 wt. % of a second propylene polymer having a melt flow rate of about 1 to about 10 dg/min (230° C., 2.16 kg), and
   c. about 5 to about 25 wt. % of a hydrocarbon polymer additive comprising a hydrogenated polycyclic resin having a softening point of about 25 to about 200° C.

2. The fiber of claim 1, wherein the first polypropylene polymer is a homopolymer.

3. The fiber of claim 1, wherein the first polypropylene polymer is a copolymer.

4. The fiber of claim 3, wherein the copolymer comprises a comonomer derived from ethylene, hexene, or octene.

5. The fiber of claim 1, wherein the first propylene polymer has a heat of fusion (Hf) greater than about 70 J/g.

6. The fiber of claim 1, wherein the fibers are about 1.2 to about 4.8 denier.

7. The fiber of claim 1, wherein the fibers have an elongation of at least about 210%.

8. A fiber comprising a polyolefin composition comprising:
   a. about 60 to about 90 wt. %, based on the total weight of the fiber, of a first propylene polymer having:
      a melt flow rate of about 1 to about 5000 dg/min (230° C., 2.16 kg) and,
      a Mw/Mn of about 3 or less,
   b. about 5 to about 35 wt. % of a second propylene polymer having a melt flow rate of about 1 to about 10 dg/min (230° C., 2.16 kg), and
   c. about 5 to about 25 wt. % of a hydrocarbon polymer additive having a softening point of about 25 to about 200° C.;
   wherein the hydrocarbon polymer additive is masterbatched with a propylene polymer.

9. The fiber of claim 1, wherein the fibers comprise from about 8 to about 23 wt. % hydrocarbon polymer additive, based on the total weight of the fiber.

10. The fiber of claim 1, wherein the hydrocarbon polymer additive has a softening point of about 50 to about 150° C.

11. The fiber of claim 8 wherein the hydrocarbon polymer additive comprises hydrogenated polycyclic resin.

12. A fabric comprising a fiber of claim 1.

13. The fabric of claim 12, wherein the fabric is a non-woven fabric.

14. The fabric of claim 12, wherein the fabric is a woven fabric.

15. A fiber comprising a polyolefin composition comprising:
   a. at least 50 wt. %, based on the total weight of the fiber, of a propylene polymer having:
      a melt flow rate of about 8 to about 2000 dg/min (230° C., 2.16 kg) and,
      a Mw/Mn of about 3 or less;
   b. a hydrocarbon polymer additive comprising hydrogenated polycyclic resin, and wherein the fiber:
      is less than about 50 denier, and
      has an elongation at break of at least about 200%.

16. The fiber of claim 1, wherein the fiber is prepared by a process comprising the steps of:
   a. providing a polyolefin composition comprising:
      i. about 60 to about 90 wt/% of a first propylene polymer having a melt flow rate of about 8 to about 2000 dg/min (230° C., 2.16 kg), and a Mw/Mn of about 3 or less, and
      ii. about 5 to about 35 wt. % of a second propylene polymer having melt flow rate of about 1 to about 6 dg/min (230° C., 2.16 kg), and about 5 to about 25 wt. % of a hydrocarbon resin having a softening point of about 50 to about 160° C., wherein the hydrocarbon resin is masterbatched with the second propylene polymer prior to combining with the first propylene polymer; and
   b. forming the polyolefin composition into one or more fibers of about 1 to 5 denier and having an elongation at break of at least about 200%.

17. The fiber of claim 16, wherein the fiber has a resulting speed to break of about 2000 to about 3500 m/min.

18. The fiber of claim 16, wherein the second propylene polymer is compatible with the hydrocarbon resin, and wherein the fiber is prepared by masterbatching the hydrocarbon resin with the second propylene polymer to form a substantially homogenous dispersion prior to contacting with the first propylene polymer.

19. The fiber of claim 16, wherein the fibers are formed by spinning.

20. A woven fabric comprising the fiber of claim 16.

21. A non-woven fabric comprising the fiber of claim 16.

22. A diaper comprising the fabric of claim 12.

23. A diaper comprising the fabric of claim 13.

24. A diaper comprising the fabric of claim 14.

* * * * *